(12) United States Patent
Bilek et al.

(10) Patent No.: US 9,922,569 B2
(45) Date of Patent: Mar. 20, 2018

(54) SYSTEM AND METHOD FOR MONITORING A COMMUNICATION CHANNEL AND DISPLAYING INFORMATION

(71) Applicant: HONEYWELL INTERNATIONAL INC., Morris Plains, NJ (US)

(72) Inventors: Jan Bilek, Jihomoravsky Kraj (CZ); Ivan Lacko, Cana (CZ); Jiri Vasek, Brno (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/014,347

(22) Filed: Feb. 3, 2016

(65) Prior Publication Data
US 2017/0221369 A1 Aug. 3, 2017

(51) Int. Cl.
G01C 21/00 (2006.01)
G08G 5/00 (2006.01)
H04W 4/04 (2009.01)
G01C 23/00 (2006.01)

(52) U.S. Cl.
CPC .......... *G08G 5/0047* (2013.01); *G01C 23/00* (2013.01); *G08G 5/0008* (2013.01); *G08G 5/0013* (2013.01); *G08G 5/0021* (2013.01); *G08G 5/0078* (2013.01); *G08G 5/0091* (2013.01); *H04W 4/046* (2013.01)

(58) Field of Classification Search
None
See application file for complete search history.

(56) References Cited

U.S. PATENT DOCUMENTS

| 6,160,497 A | 12/2000 | Clark |
| 8,704,701 B2 | 4/2014 | Pschierer et al. |
| 9,105,183 B2 * | 8/2015 | Samuthirapandian ..................... G08G 5/0004 |
| 2002/0094040 A1 * | 7/2002 | Oyagi ................... H04H 60/12 375/340 |
| 2007/0222665 A1 * | 9/2007 | Koeneman .......... G01S 13/9303 342/29 |
| 2008/0133136 A1 * | 6/2008 | Breed .................. B60N 2/2863 701/301 |
| 2012/0182161 A1 * | 7/2012 | Rutherford .......... G08G 5/0008 340/945 |
| 2013/0093612 A1 * | 4/2013 | Pschierer ............. G08G 5/0013 342/36 |

FOREIGN PATENT DOCUMENTS

EP 2584549 A1 4/2013

OTHER PUBLICATIONS

Aslm El-Gharabavvy, A.; Graphical NOTAMs—Finally a Reality, AeronavData, 2013.
(Continued)

*Primary Examiner* — Julie Lieu
(74) *Attorney, Agent, or Firm* — Lorenz & Kopf, LLP (57) ABSTRACT

A system and method for monitoring a communication channel and displaying information. A signal is received via the communication channel and signal information is extracted from the signal. The signal information is monitored for a predetermined indicator. Selected information is extracted from the signal information when the predetermined indicator is detected in the signal information and then displayed.

16 Claims, 7 Drawing Sheets

(56) References Cited

OTHER PUBLICATIONS

Claudiu-Mihai Geacar; Reducing Pilot/ATC Communication Errors Using Voice Recognition; 27th International Congress of the Aeronautical Sciences, Faculty of Aerospace Engineering, Politehnica University, 2013.
EP Search Report for Application No. 16204533.0-1803 dated Jun. 19, 2017.
Extended EP Search Report for Application No. 16204533.0-1803 dated Sep. 8, 2017.

* cited by examiner

SYSTEM AND METHOD FOR MONITORING A COMMUNICATION CHANNEL AND DISPLAYING INFORMATION

TECHNICAL FIELD

The present invention generally relates to communication systems, and more particularly relates to a system and method for monitoring an aviation communication channel and selectively displaying relevant information.

BACKGROUND

Air Traffic Management environments are characterized by intensive radio communication between Air Traffic Controllers (ATCs) and all aircraft which fall under authority of particular ATC. Flight crews need to carefully and continuously monitor a specific communication channel for relevant radio communications in order to hear information which is important for the given flight. In addition to ATC instructions that apply to the specific aircraft (e.g., route clearance), these communication channels also contain information from surrounding traffic which may be relevant for a given flight. For example, other aircraft on the same ATC channel may report conditions such as turbulence or windshear at a particular location. This can be very demanding for a flight crew and valuable information may be unheard. Such an occurrence is especially likely in situations associated with high workload or when aural information is presented simultaneously with ATC communication.

If the flight crew does not properly monitor the information over the ATC channel aircraft specific instructions or ATC calls may be missed. Furthermore, messages may noticed late, relevant information may be missed, information may not be properly located on a map, and information originating from surrounding traffic, even if properly interpreted at the time, may not become relevant for a significant period of time and may not be recalled when required.

Accordingly, it is desirable to develop a system and method for monitoring a communication channel and selectively displaying relevant information to a flight crew. In addition, it is desirable to develop a system and method that may identify the presence of predetermined indicators communicated over the communication channel and display the relevant information to the flight crew. Furthermore, other desirable features and characteristics of the present invention will become apparent from the subsequent detailed description of the invention and the appended claims, taken in conjunction with the accompanying drawings and this background of the invention.

BRIEF SUMMARY

A system for monitoring a communication channel and displaying information includes a receiver configured to receive a signal via the communication channel. The system further includes a processor configured to extract signal information from the signal. A monitoring device is configured to monitor the signal information for a predetermined indicator and extract selected information from the signal information when the predetermined indicator is detected in the signal information. A display is configured to display the selected information.

A method for monitoring a communication channel and displaying information to a includes receiving a signal via the communication channel and extracting signal information from the signal. The method further includes monitoring the signal information for a predetermined indicator and extracting selected information from the signal information when the predetermined indicator is detected in the signal information. The method displays the selected information to the flight record.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described below in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a controller, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Figure 1:
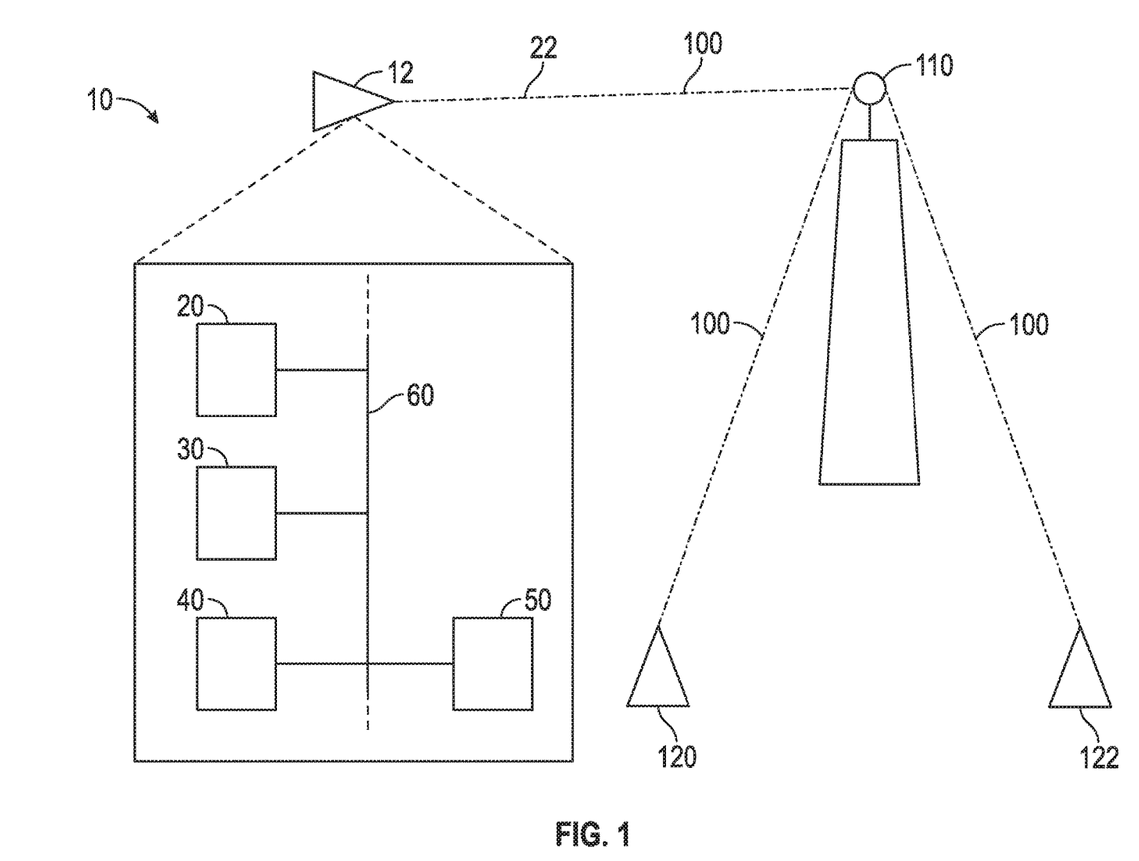
FIG. 1 is a simplified block diagram of an exemplary system for monitoring a communication channel according to an embodiment.

With reference to FIG. 1, there is shown a non-limiting example of a system 10 for monitoring a communication channel 100 and displaying information. It should be appreciated that the overall architecture, setup and operation, as well as the individual components of the illustrated system 10 are merely exemplary and that differently configured systems may also be utilized to implement the examples of the system 10 disclosed herein. Thus, the following paragraphs, which provide a brief overview of the illustrated system 10, are not intended to be limiting.

The system 10 is generally implemented on an aircraft 12 and includes a receiver 20, a processor 30, a monitoring device 40, and a display 50 in communication over a bus 60. The term "device," as used herein, generally refers to electronic component and may include a processor in communication with a memory as is known to those skilled in the art, and is not intended to be limiting. The aircraft 12 may be any type of commercial, private, or military aircraft, etc., and is equipped with suitable hardware and software that enables it to communicate over the communication channel 100. The receiver 20, processor 30, monitoring device 40, and display 50 are onboard the aircraft 12 and operatively coupled to the bus 60.

In an exemplary embodiment, the communication channel 100 includes signals transmitted between the aircraft 12, a control tower 110, and additional aircraft 120, 122, In a preferred embodiment the communication channel 100 is an open communication channel in which the airspace users including the aircraft 12, control tower 110, and additional aircraft 120, 122 all communicate over an open frequency so that each airspace user can hear communications between other airspace users over the communication channel 100.

In an open communication channel 100, there is the potential for pertinent information to be lost in a near constant stream of communication. It is for this reason that ATC calls from the control tower 110 to an aircraft begin with the aircraft's unique call number. This alerts the flight crew that the following information or instructions pertain to the aircraft. The flight crew typically does not pay attention to communications over the communication channel 100 when their call number is not used or when they are not expecting information as such constant listening is both distracting and impractical.

In a non-limiting embodiment, the system 10 uses speech recognition to convert audible communications over the communication channel 100 into signal information or digital text. The signal information is monitored for information that not only is directed towards the aircraft 12, but additionally information about the environment surrounding the aircraft 12 that would not normally be of interest to the flight crew for the reasons stated above. When potentially relevant text is detected, the relevant text surrounding the term (selected information), is extracted and displayed to the flight crew.

Air traffic control (ATC) is a service provided by ground-based control towers 110 who direct aircrafts 12, 120, 122 on the ground and through controlled airspace, and can provide advisory services to aircraft in non-controlled airspace. Generally speaking, aircrafts 12, 120, 122 communicate directly to the control tower 110 and not with one another. However, the communication channel 100 is open to allow airspace users to hear the communications between the control tower 110 and the aircrafts 12, 120, 122. In this way, while the aircraft 12 does not directly communicate with the additional aircraft 120, 122, the aircraft 12 is nonetheless able to hear and monitor the communications between additional aircraft 120, 122 and the control tower 110.

The receiver 20 is configured to receive a signal 22 via the communication channel 100. In a preferred embodiment the signal 22 is an electromagnetic communication and is, more specifically, a radio signal. In a non-limiting embodiment the signal 22 is an audio signal. The specific frequency and protocol used to facilitate communication between the airspace users including the aircraft 12, control tower 110, and additional aircraft 120, 122 is not contemplated by the present disclosure. However, one skilled in the art will appreciate each of the airspace users has the proper hardware and software necessary to allow communication over the communication channel 100.

The processor 30 is configured to extract signal information from the signal 22. In a preferred embodiment, the processor 30 uses speech recognition to extract the signal information from audible communications of the signal 22. The specific speech recognition algorithm utilized by the processor 30 is not contemplated by the present disclosure and one skilled in the art will appreciate that speech recognition may be used in this way to extract information from the signal 22.

The monitoring device 40 is configured to monitor the signal information for a predetermined indicator 80 or keyword. When the monitoring device 40 detects the predetermined indicator 80 in the signal information, the monitoring device 40 extracts selected information 70 from the signal information. In a preferred embodiment, the monitoring device 40 monitors and searches the signal information for predetermined indicators 80 that are indicative of information relevant to the aircraft 12. Non-limiting examples of predetermined indicators 80 include an ownership call sign of the aircraft 12 and keywords likely to be relevant to the aircraft 12. Non-limiting exemplary keywords include "mayday"; "holding"; "swingover"; "turbulance"; "thunderstorm"; and "windshear."

In a non-limiting embodiment, the monitoring device 40 uses predetermined rules and predetermined processing to recognize relevant communications. In a non-limiting example, these rules include notifying the flight crew about conversation relevant to the aircraft 12 flight plan, waypoints, airports, and runways.

In a non-limiting embodiment, the monitoring device 40 filters the signal information based on context of the keyword to eliminate non-relevant messages containing the keyword. In a non-limiting example, the context of the key word's use includes situations where a keyword is inadvertently used, the keyword is a homonym, or the remainder of the message fails to provide any additional information relating to the keyword.

In this way, the monitoring device 40 monitors the signal information for instances in which the aircraft's call sign is used, which indicates that the aircraft 12 is being addressed directly by the control tower 110. This in turn means that the information following the use of the aircraft's call sign is of particular interest to the aircraft 12. Furthermore, the monitoring device 40 monitors for keywords that are associated with weather conditions, positioning of the additional aircraft 120, 122, or instructions that may be relevant to the aircraft 12. While an exemplary list of keywords has been disclosed above, one skilled in the art will appreciate that the predetermined indicators 80 contemplated by the present disclosure encompass additional words and phrases that are relevant to the aircraft 12 such as those relating to navigation, weather conditions, aircraft operation, etc. and the present listing should not be interpreted as limiting.

In a non-limiting embodiment, the monitoring device 40 is configured to monitor the signal information from a plurality of signals 22 communicated over a plurality of communication channels 100. One skilled in the art will appreciate that the aircraft 12 may receive information over a plurality of communication channels 100 other than ATC from the tower 110. Accordingly, the flight crew may only be able to listen to a few channels at a time and information on other channels may be missed. In a non-limiting embodiment, the system 10 is configured to process all the channels and signals received by the aircraft 12. In an embodiment, the system 10 is implemented as a ground based system that is not onboard the aircraft 12.

When the predetermined indicator 80 is detected, the monitoring device 40 extracts selected information 70 from the signal information. In a preferred embodiment, the selected information 70 is a portion of the signal information relating to the predetermined indicator 80. By way of example, in a non-limiting embodiment, in ATC communications the control tower 110 states the call sign of the aircraft 12 when communicating with the aircraft 12. The call sign is a unique alphanumeric code associated with that specific aircraft 12. In an embodiment, any portion of the signal information following the recitation of the aircraft 12 call sign will be relevant to the aircraft 12 and is extracted as selected information 70. Similarly, when one of the additional aircrafts 120, 122 communicates a weather condition or term that matches one of the predetermined indicators 80s, the portion of the signal information relating to that predetermined indicator 80 is extracted as selected information 70.

The display 50 is configured to display the selected information 70 to a flight crew (not shown) of the aircraft 12. in a non-limiting embodiment, the display 50 is a screen that displays a graphical map of the area surrounding the aircraft 12 as well as textual representation of the selected information 70. In this way, the system 10 presents the flight crew with the selected information 70 that is extracted from the signal information based on the predetermined indicator 80. One skilled in the art will appreciate that modern aircraft 12 have a number of displays 50 capable of displaying information in this way and the exemplary depictions of the present disclosure should be in no way limiting.

With continued reference to FIG. 1, FIGS. 2-6 are exemplary depictions of the display 50 according to embodiments of the system 10. The display 50 includes a map portion 52. and a text portion 54. The map portion 52 shows the aircraft 12 and the aircraft's flight path 14 along with additional aircraft 120, 122. The symbols used to depict the aircraft 12, flight path 14, and additional aircraft 120, 122 are merely exemplary and are not limiting. The map portion 54 also includes a symbol 74 corresponding to the predetermined indicator 80. In the non-limiting embodiment of FIG. 2, the symbol 74 is associated with a thunderstorm 84. The map portion 52 may further display additional information such as topographical information, navigational information, and weather information, etc., and the limited view depicted herein is to aid in understanding the present disclosure.

The display 50 also includes the text portion 54 adjacent to or overlying the map portion 52. The text portion 54 displays the textual component of the selected information 70. In a non-limiting embodiment, the selected information 70 includes symbols 72, 74, 76 corresponding to the predetermined indicators 82, 84, 86. In the non-limiting embodiment of FIG. 2, the exemplary symbols include a holding symbol 72, a thunderstorm symbol 74, and a icing symbol 76. The symbols 72, 74, 76 are associated with the predetermined indicators holding 82, thunderstorm 84, and severe icing 86, respectively. The symbols 72, 74, 76 and predetermined indicators 82, 84, 86 are merely exemplary and should not be interpreted as limiting.

The selected information 70 displayed in the text portion 54 further includes additional information 90 such as a call sign, a time stamp, or flight code corresponding to the selected information. For example, in the non-limiting embodiment of FIG. 2, the holding indicator 82 has a time stamp of "11:07" which alerts the flight crew that the selected information 70 associated with the holding indicator 82 and holding symbol 72 from that time.

In a non-limiting embodiment, the selected information 70 includes a location and the display 50 is configured to display the symbol 74 at the location. In the non-limiting embodiment of FIG. 2, the thunderstorm symbol 74 is positioned on the map portion 52 to provide the flight crew with a visual representation of the location of the thunderstorm 84 relative to the aircraft 12 and the flight path 14. In this way, the flight crew is provided with information in a manner that allows them to easily assess the importance of the information. In a non-limiting embodiment, the information displayed by the map portion 52 is supplemented with topographical information, navigational information, and weather information, etc., to improve the visual representation of the environment surrounding the aircraft 12. In a non-limiting embodiment, the symbols include the flight level at which the corresponding predetermined indicator was detected.

With reference now to FIGS. 3-6, exemplary depictions of the display 50 according to embodiments of the system 10 is shown. As FIGS. 3-6 are similar to FIG. 2, similar reference numerals will be used and the description of FIGS. 3-6 will focus on the differences relative to FIG. 2.

Figure 2:
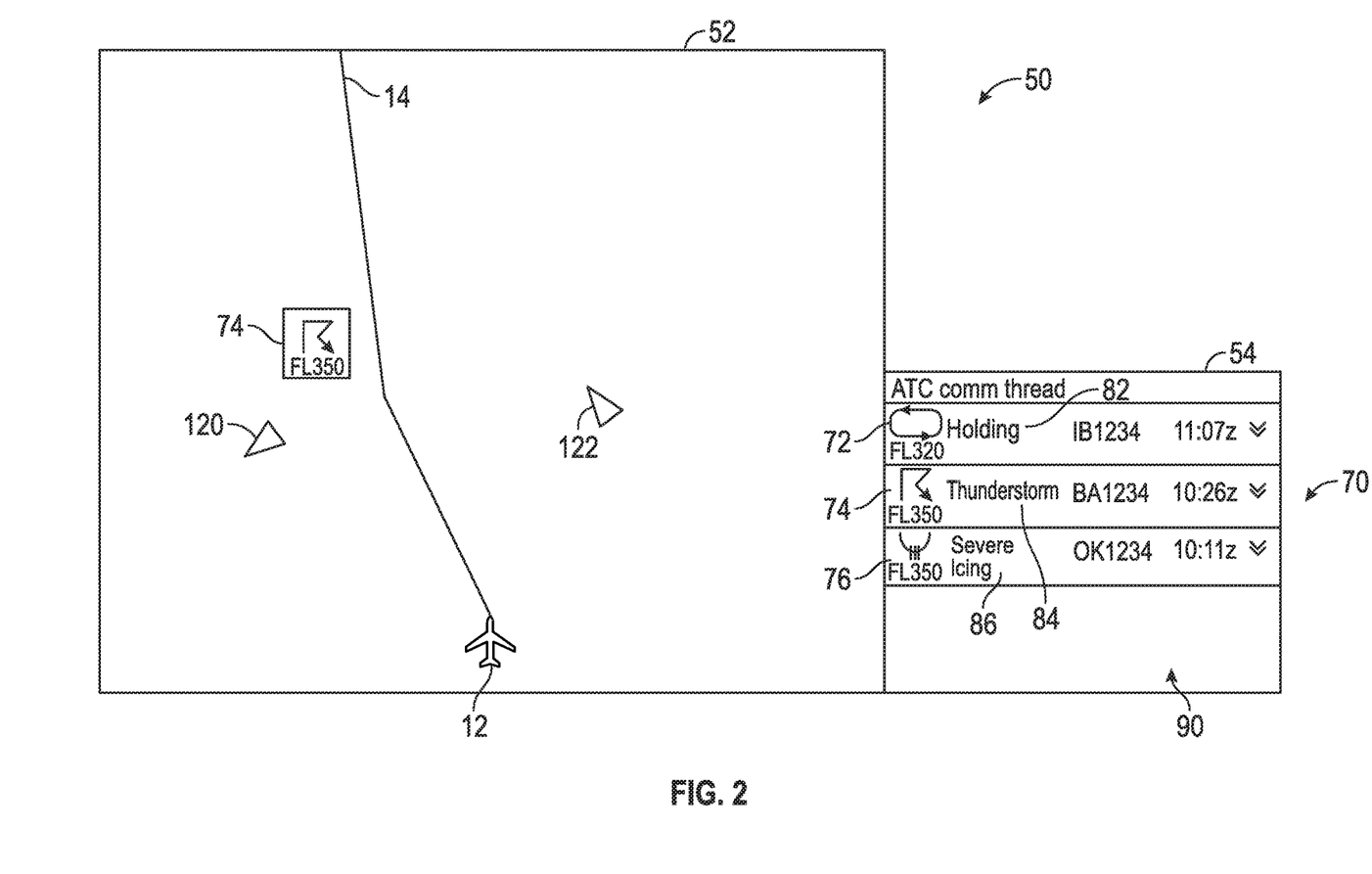
FIG. 2 is an exemplary display of selected information according to an embodiment of the system of FIG. 1.
Figure 3:
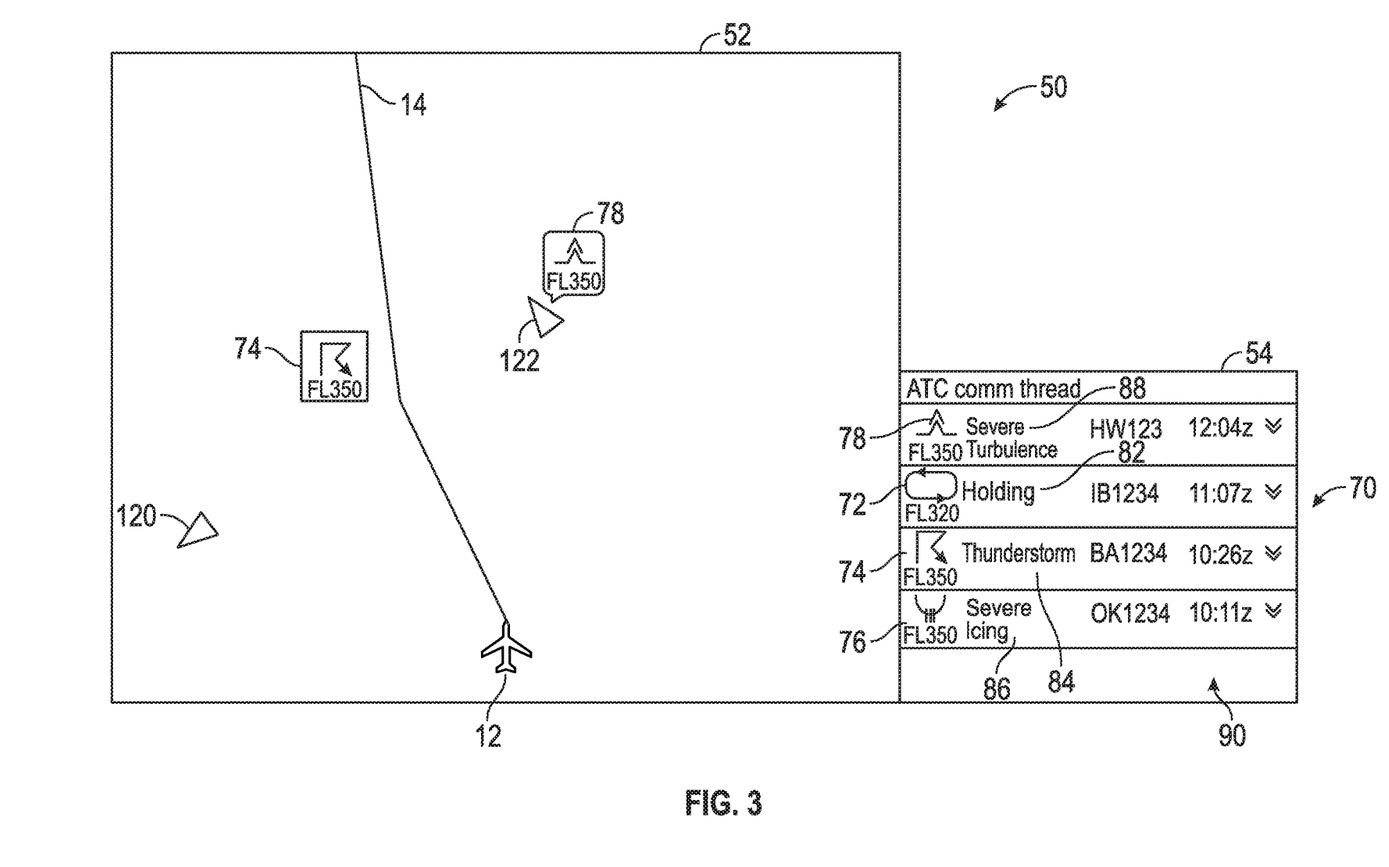
FIG. 3 is an exemplary display of selected information according to an embodiment of the system of FIG. 1.
Figure 4:
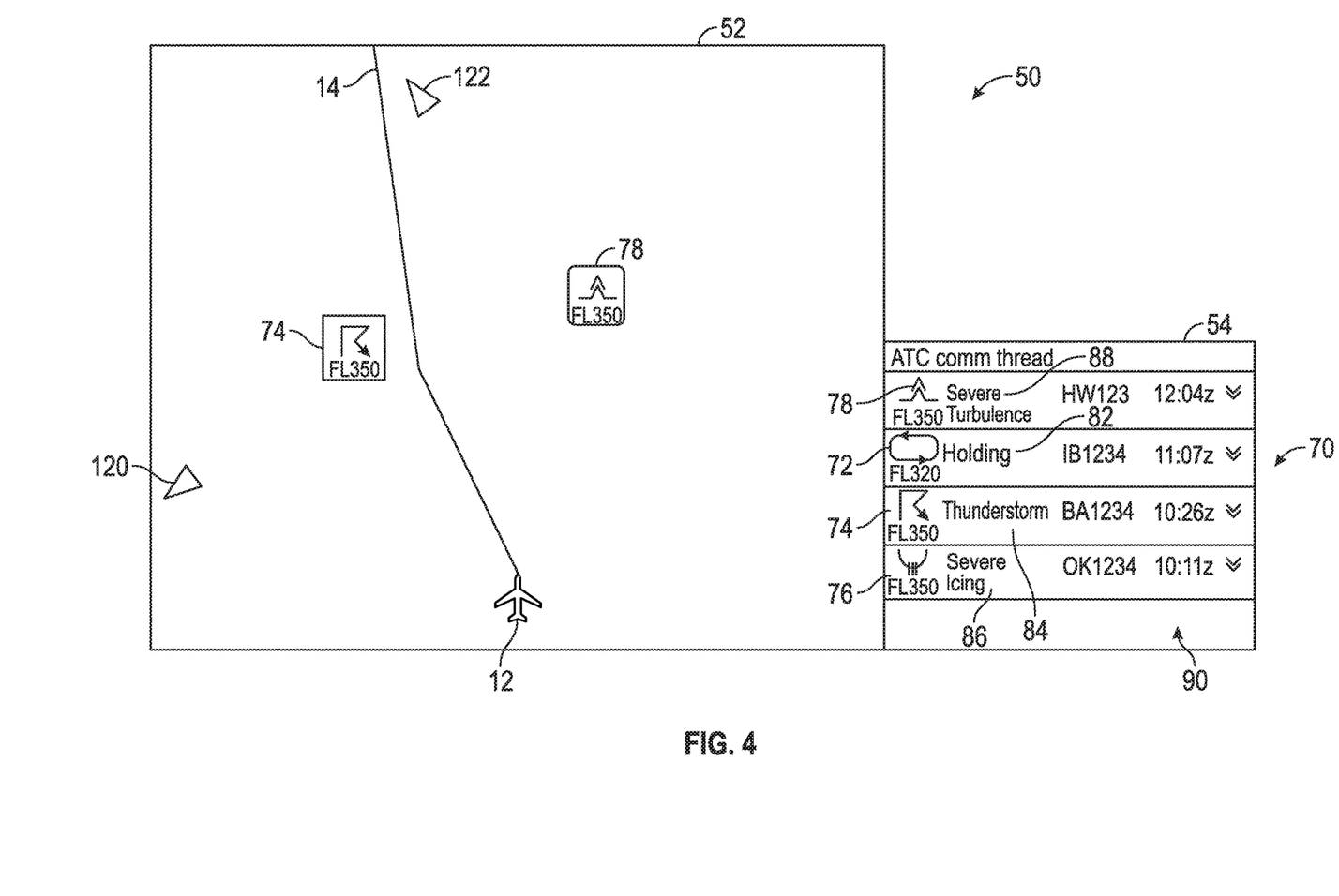
FIG. 4 is an exemplary display of selected information according to an embodiment of the system of FIG. 1.

As shown in FIG. 3, each of the additional aircraft 120, 122 have changed position relative to the depiction of FIG. 2. The aircraft 122 has reported severe turbulence via the communication channel 100 to the control tower 110. The monitoring device 40 detects the turbulence indicator 88 in the signal information and provides the display 50 of the aircraft 12 with the selected information 70. In a non-limiting embodiment, the turbulence indicator 88 is the triggered by the presence of the word "turbulence" in the signal information. The display 50 is accordingly updated, relative to FIG. 2, and the map portion 52 includes a turbulence symbol 78 and the text portion 54 includes a turbulence indicator 88 and additional information corresponding to the reported turbulence. In a non-limiting embodiment, a state of the turbulence symbol 78 indicates that the turbulence is actively being reported by the aircraft 122, in contrast to the state of the thunderstorm symbol 74 which is not being actively reported. As shown in FIG. 4, the aircraft 122 has moved and the state of the turbulence symbol 78 has changed to indicate that the turbulence is not actively being reported by the aircraft 122 and is static. The turbulence symbol 78 remains at the location where it was reported by the aircraft 122.

Figure 5:
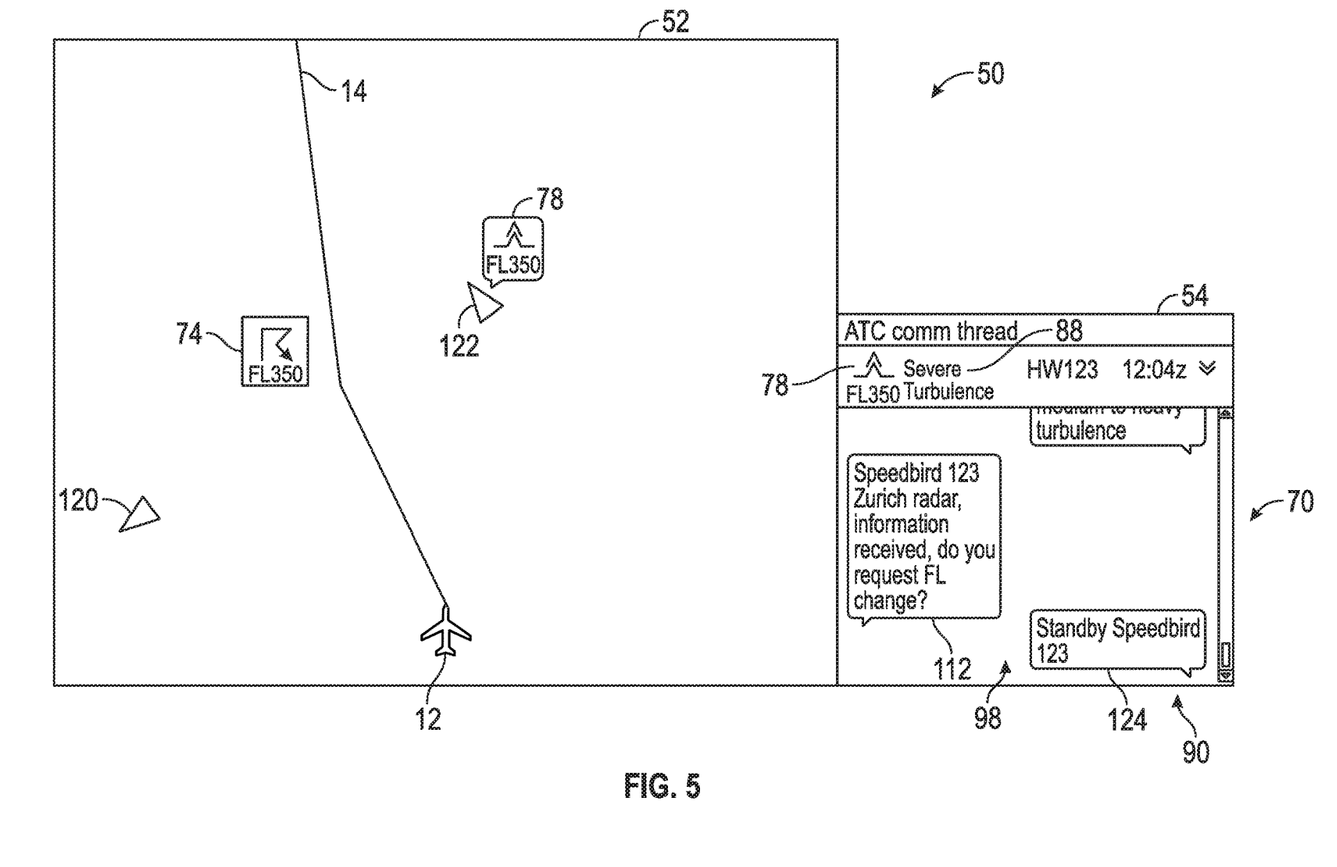
FIG. 5 is an exemplary display of selected information according to an embodiment of the system of FIG. 1.

The text portion 54 of FIG. 5 depicts a situation in which the flight crew has decided to access details relating to the turbulence indicator 88. The text portion 54 displays the selected information 70 corresponding to the turbulence. In a non-limiting example, the selected information includes a transcription 98 of the communications transmitted over the communication channel 100 between the aircraft 122 and the control tower 110. In a non-limiting embodiment, the transcription 98 is a communication history of all the communications transmitted over the communication channel 100 and the selected information 70 is the portion of the communication history that corresponds to the predetermined indicator 80. By way of example with respect to FIG. 5, when the flight crew desires additional information surrounding the turbulence indicator 88 and selects the details, the text portion 54 displays the transcript 98 of the communication history corresponding to the reported turbulence.

In a non-limiting embodiment, the transcript 98 is depicted in a conversational format to allow the flight crew to easily ascertain the source of the communication. By way of example with respect to FIG. 5, communications 112 from the control tower 110 are shown on the left side of the text portion 54 and communications 124 from the aircraft 122 are shown on the right side of the text portion 54.

Figure 6:
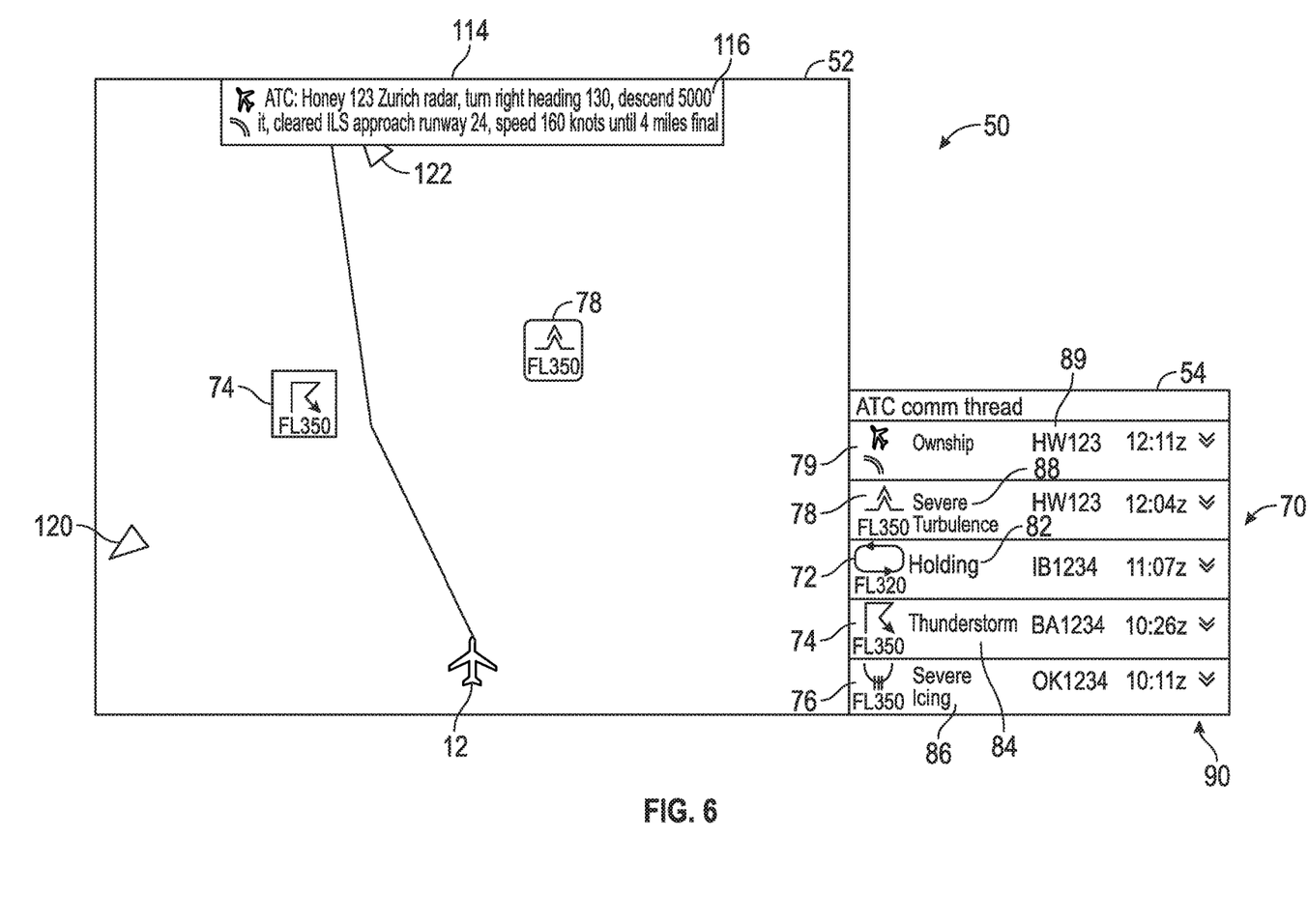
FIG. 6 is an exemplary display of selected information according to an embodiment of the system of FIG. 1.

As shown in FIG. 6, each of the additional aircraft 120, 122 have again changed position relative to the depiction of FIGS. 2-5. In FIG. 6, the control tower 110 has sent a message to the aircraft 12 via the communication channel 100. The monitoring device 40 detects a call sign 89 of the aircraft 12 in the signal information and provides the display 50 of the aircraft 12 with the selected information 70. The display 50 is accordingly updated, and the map portion 52 includes an aircraft ownership communication 114 and the text portion 54 includes an ownership symbol 79 and call sign 89. In a non-limiting embodiment, the ownership communication 114 includes a transcription 116 of the communication from the control tower 110 to the aircraft 12 via the communication channel. In a non-limiting embodiment, the ownership communication 113, ownership symbol 79, and call sign 89 are accompanied by an alert to notify the flight crew. For example, in contrast to the previously discussed symbols and indicators, the ownership communication 114 automatically includes the transcription 116 of the communication from the control tower 110. Additionally, the alert may include an audible alert, color change, text flash, etc., to alert the flight crew to the importance of the message.

In a non-limiting embodiment, the monitoring device 40 is configured to prioritize the selected information 70 based upon the detected predetermined indicator 80. As detailed in the description of FIG. 6, when the monitoring device 40 detects the call sign 89 of the aircraft 12 in the signal information, the selected information is prioritized to help ensure that the flight crew is made aware of the communication. In a non-limiting embodiment, the selected information 70 is similarly prioritized based upon the detected predetermined indicator 80. For example, the thunderstorm symbol 74 may be prioritized relative to a holding symbol 72. This prioritization may include an audible alert, color change, text flash, etc., to alert the flight crew to the importance of the message relative to the others on the display 50.

In a non-limiting embodiment, the monitoring device 40 is configured to prioritize the selected information 70 based upon the flight path 14 of the aircraft 12. As discussed above, the selected information 70 includes a location and the display 50 is configured to display the symbol 74, 78 at the location on the map portion 52. With reference to FIGS. 3-6, the thunderstorm symbol 74 is in dose proximity to the flight path 14 of the aircraft 12. Accordingly, in a non-limiting embodiment, the thunderstorm symbol 74 and the thunderstorm indicator 84 may be prioritized relative to the turbulence symbol 78 and turbulence indicator 88.

Figure 7:
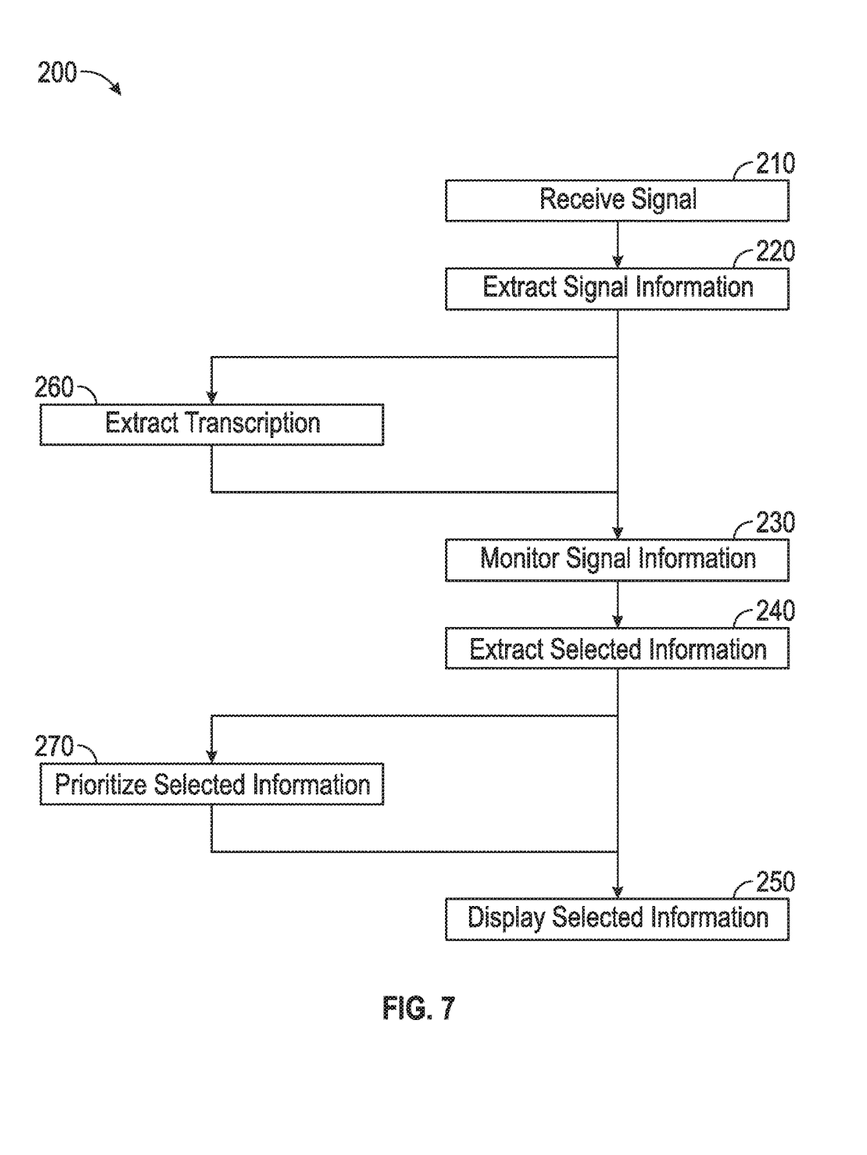
FIG. 7 is a simplified flow diagram of a method for monitoring a communication channel according to an embodiment.

Referring now to FIG. 7, and with continued reference to FIGS. 1-6, a flowchart 200 illustrates a method performed by the system 10 for monitoring the communication channel 100 and displaying information in accordance with the present disclosure. As can be appreciated in light of the disclosure, the order of operation within the method 200 is not limited to the sequential execution as illustrated in FIG. 7, but may be performed in one or more varying orders as applicable and in accordance with the requirements of a given application.

In various exemplary embodiments, the system 10 and method 200 are run based on predetermined events, and/or can run continuously during operation of the aircraft 12. The method 200 starts at 210 with receiving a signal 22 via the communication channel 100. At 220, the method 200 extracts signal information from the signal 22. At 230 the signal information is monitored for the predetermined indicator 80. At 240 the selected information is extracted from the signal information when the predetermined indicator 80 is detected in the signal information. If, however, the predetermined indicator 80 is not detected, then the method continues to monitor the signal 22 for the predetermined indicator 80. At 250 the selected information is displayed. The method 200 then proceeds to 210 and receives the signal 22 as necessary.

In a non-limiting embodiment, at 250 the method 200 includes displaying the symbol 74, 78 corresponding to the predetermined indicator 84, 88. In a non-limiting embodiment, at 250 the method 200 includes displaying the symbol 74, 78 at the location extracted from the selected information 70. In a non-limiting embodiment, at 250 the method 200 includes displaying an identifier associated with a source extracted from the selected information 70.

In a non-limiting embodiment, at 230 the predetermined indicator 80 includes at least one of the ownership call sign 89 and the keyword, in a non-limiting embodiment, at 210 the signal 22 is received via the air traffic control radio channel.

In a non-limiting embodiment, at 260 the method 200 includes extracting the transcription 98 of communications transmitted over the communication channel and at 250 displaying the transcription 98. In a non-limiting embodiment, at 260 the transcription 98 is a communication history thread of all communications transmitted over the communication channel 100

In a non-limiting embodiment, at 270 the method 200 includes prioritizing the selected information 70 based upon the detected predetermined indicator 80. In a non-embodiment, at 270 the method 200 includes prioritizing the selected information 70 based upon the flight path 14

While at least one exemplary embodiment has been presented in the foregoing detailed description of the invention, it should be appreciated that a vast number of variations exist. It should also he appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for monitoring a communication channel and displaying information comprising:
    a receiver configured to receive a signal via the communication channel;
    a processor configured to extract signal information from the signal;
    a monitoring device configured to monitor the signal information for a predetermined indicator, extract selected information from the signal information when the predetermined indicator is detected in the signal information, and prioritize the selected information based upon the detected predetermined indicator; and
    a display configured to display the selected information, wherein the predetermined indicator includes an ownership call sign and a relevant keyword.

2. The system of claim 1, wherein the display is configured to display a symbol corresponding to the predetermined indicator.

3. The system of claim 2, wherein the selected information includes a location and the display is configured to display the symbol at the location on a map.

4. The system of claim 1, wherein the selected information includes an identifier associated with a source of the selected information.

5. The system of claim 1, wherein the signal is received via an air traffic control radio channel.

6. The system of claim 1, wherein the processor is configured to extract the signal information with speech recognition to generate a transcription of communications transmitted over the communication channel, and the display is configured to display the transcription.

7. The system of claim 6, wherein the transcription is a communication history thread of all communications transmitted over the communication channel.

8. The system of claim 1, wherein the monitoring device is configured to prioritize the selected information based upon a flight path.

9. A method for monitoring a communication channel and displaying information, comprising:
    receiving a signal via the communication channel;
    extracting signal information from the signal;
    monitoring the signal information for a predetermined indicator, the predetermined indicator including an ownership call sign and a relevant keyword;
    extracting selected information from the signal information when the predetermined indicator is detected in the signal information;
    prioritizing the selected information based upon the detected predetermined indicator; and
    displaying the selected information.

10. The method of claim 8, further comprising displaying a symbol corresponding to the predetermined indicator.

11. The method of claim 10, further comprising displaying the symbol on a map at a location extracted from the selected information.

12. The method of claim 8, further comprising displaying an identifier associated with a source extracted from the selected information.

13. The method of claim 8, wherein the signal is received via an air traffic control radio channel.

14. The method of claim 8, further comprising:
    extracting a transcription of communications transmitted over the communication channel using speech recognition; and
    displaying the transcription.

15. The method of claim 14, wherein the transcription is a communication history thread of all communications transmitted over the communication channel.

16. The method of claim 8, further comprising prioritizing the selected information based upon a flight path.

* * * * *